(12) United States Patent
Galvan

(10) Patent No.: US 8,919,040 B2
(45) Date of Patent: Dec. 30, 2014

(54) SPIRAL GARDEN

(71) Applicant: Rocquel S. Galvan, Fort Belvoir, VA (US)

(72) Inventor: Rocquel S. Galvan, Fort Belvoir, VA (US)

( * ) Notice: Subject to any disclaimer, the term of this patent is extended or adjusted under 35 U.S.C. 154(b) by 200 days.

(21) Appl. No.: 13/625,313

(22) Filed: Sep. 24, 2012

(65) Prior Publication Data
US 2014/0083007 A1 Mar. 27, 2014

(51) Int. Cl.
A01G 31/02 (2006.01)

(52) U.S. Cl.
CPC .................................. A01G 31/02 (2013.01)
USPC .......................................... 47/62 R; 47/62 A

(58) Field of Classification Search
CPC ....... A01G 31/02; A01G 9/023; A01G 9/022; A01G 31/06; A01G 31/00; A01G 9/025; A01G 31/001; A01G 9/02; A01G 9/00
USPC .......... 47/59 R, 62 R, 62 A, 62 C, 63, 82, 83, 47/41.01
See application file for complete search history.

(56) References Cited

U.S. PATENT DOCUMENTS

| | | | | | |
|---|---|---|---|---|---|
| 147,849 | A | * | 2/1874 | Leslie | 47/39 |
| 875,235 | A | * | 12/1907 | Bastel | 47/82 |
| 1,217,239 | A | * | 2/1917 | Swartz | 47/18 |
| 3,252,252 | A | * | 5/1966 | Muelberger, Jr. | 47/82 |
| 3,452,475 | A | * | 7/1969 | Johnson, Sr. | 47/82 |
| 4,123,873 | A | * | 11/1978 | Canova | 47/83 |
| 4,218,847 | A | * | 8/1980 | Leroux | 47/59 R |
| 4,310,990 | A | * | 1/1982 | Payne | 47/59 R |
| 4,514,930 | A | * | 5/1985 | Schorr et al. | 47/60 |
| 4,669,217 | A | * | 6/1987 | Fraze | 47/64 |
| 4,779,378 | A | * | 10/1988 | Mason, Jr. | 47/83 |
| 5,394,647 | A | * | 3/1995 | Blackford, Jr. | 47/62 A |
| 5,428,922 | A | * | 7/1995 | Johnson | 47/82 |
| 5,440,836 | A | * | 8/1995 | Lee | 47/60 |
| 5,484,234 | A | * | 1/1996 | Worden | 405/284 |
| 6,276,089 | B1 | * | 8/2001 | Boisclair et al. | 47/62 A |
| 7,080,482 | B1 | * | 7/2006 | Bradley | 47/60 |
| 7,690,151 | B2 | * | 4/2010 | Wilkes | 47/82 |
| 8,689,485 | B2 | * | 4/2014 | Friedman | 47/83 |
| 2007/0144069 | A1 | * | 6/2007 | Gottlieb et al. | 47/82 |
| 2013/0152468 | A1 | * | 6/2013 | Huang et al. | 47/82 |

* cited by examiner

Primary Examiner — Trinh Nguyen

(57) ABSTRACT

An apparatus for hydroponic cultivation of plants comprising conical-shaped modules connected end to end with dovetail joints forming a pyramid-like spiral structure with a hollow tube-like interior which acts as a conduit for the flow of water or nutrient-rich solutions over the roots of plants placed in perforated divots on the top sections of the modules either on their own or in an inert medium matrix. The apparatus is also configured to be capable of use for aeroponic gardening or in the alternative, traditional gardening using potting or garden soil.

11 Claims, 5 Drawing Sheets

SPIRAL GARDEN

CROSS REFERENCE TO RELATED APPLICATION

This application claims priority to U.S. Design Pat. application No. 29431784 of the same title filed on Sep. 11, 2012.

FIELD OF THE INVENTION

This invention is generally related to free standing, portable garden systems. More particularly, this invention is related to a portable, modular, hydroponic spiral garden system.

BACKGROUND OF THE INVENTION

Hydroponics is a method of growing plants in nutrient-rich solutions, with or without the use of inert soil or other medium such as perlite, peat moss, vermiculite, rock/mineral wool to name a few. The inert materials primarily function as a matrix to hold the root balls of the plants which are saturated with nutrient-rich solutions for the growth of the plants. Hydroponics as a method of plant culture was first propounded by Francis Bacon in the 17$^{th}$ century. In the beginning, hydroponic cultivation of plants was practiced predominantly on a commercial scale, requiring the use of heavy and cumbersome equipment. With the increasing popularity in hydroponic plant culture, hobbyist' interested in practicing the art have had to contrive their own structures for growing plants using the technique, to fit their limited spaces.

Hydroponic systems described in the prior art are either stationary or portable. U.S. Pat. No. 7,243,460 to Darlington describes a support structure on which the matrix material holding the plant roots are fastened using a grid of fasteners for hydroponic growing of plants in a vertical orientation. An example of a vertical hydroponic system with a plurality of upwardly extending plant support structures in the form of columns is described in U.S. Pat. No. 6,502,350 to Dick. Horizontal hydroponic culture of plants are also known in the art such as the hydroponic/aeroponic drum structure described in U.S. Pat. No. 7,181,886 to Bourgoin et al., and U.S. Pat. No. 4,170,844 to Steele and U.S. Pat. No. 4,603,506 to Powell et al which use plant growing trays.

Modular hydroponic cultivating systems are also known in the prior art. One of the earlier such prior art is U.S. Pat. No. 4,704,818 to Cameron which describes a stackable, vertical hydroponic growing system composed of frusto-conical shell-like members holding rooting material for the plants. U.S. Pat. No. 7,877,927 to Roy et al., describes a modular aeroponic/hydroponic container comprising vertical columns of cultivating compartments which is mountable to a surface. U.S. Pat. No. 7,055,282 to Bryan, III is a hydroponic plant cultivating apparatus with modules stacked end to end to form a vertical planting column. An example of a horizontal modular planting apparatus is described in U.S. Pat. No. 7,080,482 to Bradley and an expandable hydroponic system is described in U.S. Pat. No. 7,975,430 to Scott.

The present invention is a modular hydroponic garden system that has a unique shape in the form of a spiral pyramid which is both functional as a hydroponic plant cultivation apparatus as well as aesthetically pleasing to look at.

SUMMARY OF THE INVENTION

The primary object of the present invention is to provide a compact, lightweight, portable hydroponic garden system for growing a variety of plants both flowering, non flowering and those that are edible.

It is another object of the present invention to provide a hydroponic garden system that has visual appeal and adds aesthetic value to any setting or landscape.

In an exemplary embodiment of the present invention, the hydroponic garden apparatus is in the shape of a spiral pyramid comprising a broad base with each ascending concentric ring of the spiral pyramid narrower than the preceding one, culminating in a top narrow ring. In this embodiment of the invention, the concentric rings of the spiral garden apparatus are formed with a plurality of pre-fabricated molded plastic modules connected end to end through dovetail-like joints. The resulting structure has a tube-like hollow interior from the top to the bottom of the apparatus to serve as a conduit for the passage of nutrient-rich solutions. In this embodiment, each module has a top and a bottom section that can be separated. The top section of each module has divots that are essentially cup-shaped perforated indentations built into the top module section to hold the plant root balls by themselves or in association with an inert soil or other medium. There are approximately three evenly spaced divots to a module in the exemplary embodiment of the invention although more than three divots per module are also envisioned within the scope of the invention. The perforations in the divots allow for the free flow of nutrient-rich solutions through the plant roots.

In the exemplary embodiment of the invention, the top ring of the spiral garden has an intake spout through which the nutrient-rich solution can be introduced into the hollow tubular modules that run the length of the apparatus. When introduced, the nutrient-rich solution bathes the roots of the plants through the perforations in the divots holding them. In the exemplary embodiment, the outtake spout at the base of the spiral garden apparatus is capped off to prevent the nutrient rich solution from exiting the system. The cap can be removed periodically to let the solution run out and fresh nutrient-rich solution introduced into the system through the intake spout at the end of the top ring.

In yet another embodiment of the spiral garden of the present invention, the apparatus can be advantageously used for aeroponic gardening of plants by spraying the nutrient rich solution directly on to the plant root balls placed on the perforated divots.

In another embodiment of the spiral garden apparatus of the present invention, the top sections of each molded plastic module with the divots can be lifted off the bottom sections and the bottom sections that are connected end to end through the dovetail joints filled with garden soil for non-hydroponic cultivation of plants.

All embodiments of the present invention can be easily assembled by engaging the pre-fabricated modules through their dovetail joint ends or taken apart for re-assembly in a different location or for storage.

In this summary of the present invention and in the specification in general, the term "divots" should be construed as a half circular molded cup-shaped structure. Further, the various references to "an exemplary embodiment," "yet another embodiment, and "another embodiment" do not all necessarily refer to the same embodiment(s). Rather, these references in general mean that a particular feature, structure, or characteristic described in connection with an embodiment is included in at least some embodiments, but not necessarily in all embodiments of the invention. It should be understood and obvious to one skilled in the art that the embodiments thus described may be further modified without departing from the spirit and scope of the invention.

The features and advantages of the embodiments of the present invention as described in this summary of the invention will be further appreciated and will become obvious to one skilled in the art when viewed in conjunction with the accompanying drawings, detailed description of the invention, and the appended claims.

DETAILED DESCRIPTION OF THE INVENTION

Figure 1:
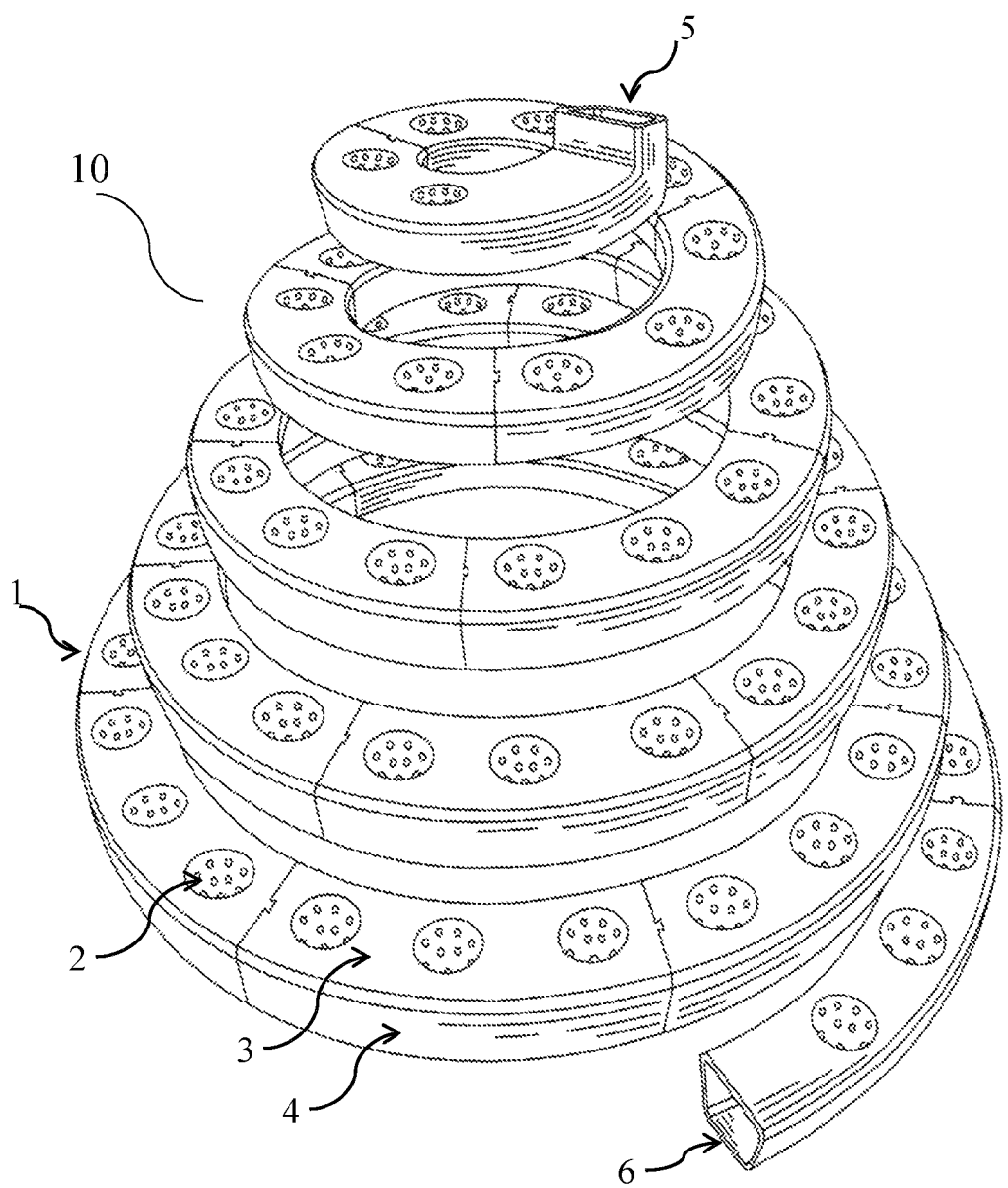
FIG. 1 is a perspective view of the exemplary embodiment of the spiral garden of the present invention.

Referring now to the drawings in which like numbers correspond to like elements in the several views, and in particular to FIG. 1, the exemplary embodiment of the spiral garden 10 apparatus of the present invention is shown. The apparatus is shaped like a spiral pyramid with a broad base and a narrow top with sufficient slope to allow the nutrient solutions to flow effortlessly down the entire length of the apparatus through the hollow tubing created by connecting a plurality of conical shaped pre-fabricated modules 1 substantially made of heavy plastic that can withstand the weight of water or nutrient solutions as well as soil when the apparatus is used for non-hydroponic plant culture. The sloped construction helps to minimize ponding and water logging within the apparatus when used for hydroponic gardening. The modules 1 connected end to end through dovetail joints provide a tight seal and exclude the entry of light into the hollow space inside to prevent algae growth.

Referring again to the figures, FIG. 1 also illustrates the circular perforated divots configured on the top section 3 of the modules 1 which seamlessly fit over the bottom section 4 of the modules 1. Each end of modules 1 both at the top section 3 and the bottom section 4 have dovetail joint ends adapted to engage with the opposite dovetail joint end of another module resulting in an end to end arrangement of the modules to form the architecture of the spiral garden 10 apparatus. The root balls of the plants are either directly ensconced in the circular perforated divots 2 or enmeshed with an inert medium matrix lining the divots 2. The intake spout 5 at the end of the top spiral ring of the garden 10 apparatus allows the introduction of nutrient-rich solution into the apparatus so that it flows down the hollow tubular interior created by the modules 1 to bathe the root balls of the plants ensconced in the perforated divots 2. In general, the apparatus of the garden 10 is sufficiently contoured to allow the nutrient-rich solution to flow effortlessly over the root balls ensconced in the perforated divots 2. In this embodiment, the outtake spout 6 at the end of the base ring of the spiral garden 10 may be capped when needed to retain the nutrient-rich solutions or uncapped to release the solution to replace with fresh solution.

In the exemplary embodiment of the spiral garden 10, the height of the apparatus is approximately, 2.87 ft (0.875 m) and the width approximately, 4.23 ft (1.2893 m) with the distance between the spiral rings approximately 2.2 inches (5.588 cm). The dimensions of the orifice of the intake spout 5 and out-take spout 6 are approximately, 5×3 inches.

Figure 2:
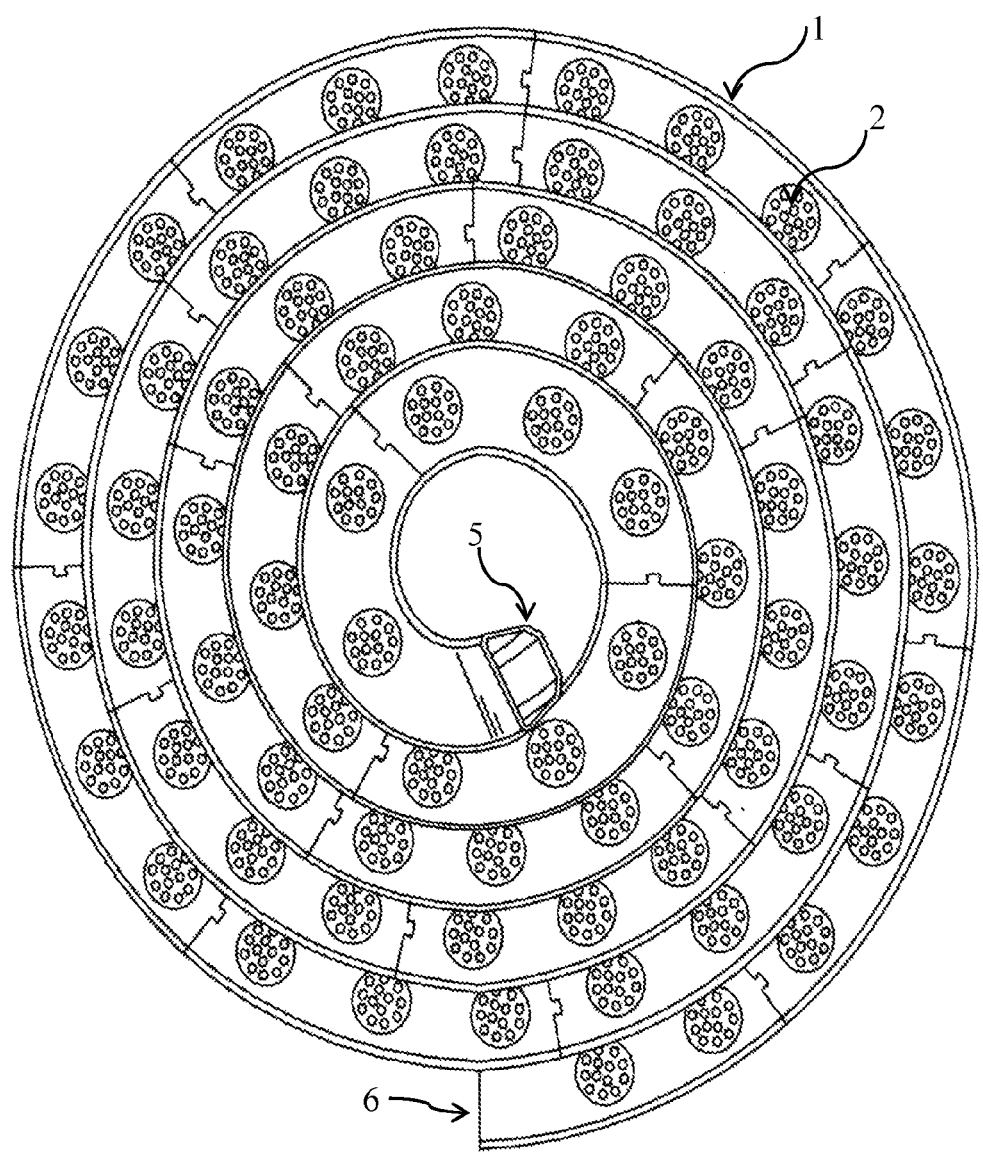
FIG. 2 is a top plan view of the spiral garden of the present invention.

FIG. 2 is a top plan, visually pleasing, view of the spiral garden 10 apparatus of the present invention with the modules connected end to end through the dovetail joints to form the concentric rings with the perforated divots 2 evenly spaced on the top modular section 3. The other structures to be seen are the intake spout 5 at the top end of the apparatus and the outtake spout 6 at the base of the apparatus.

Figure 3:
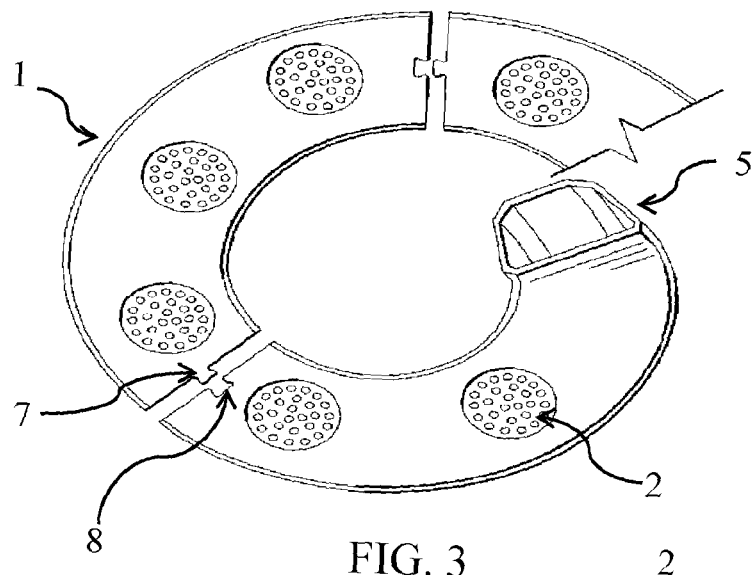
FIG. 3 is a plan view of the top ring of the spiral garden with the intake spout.

Referring now to FIG. 3, a plan view of the top ring of the spiral garden 10 is shown delineating the dovetail joint feature that enables the modules to be connected end to end to form the spiral garden 10 apparatus. In particular, as shown, the protruding wedge 7 called the pin of the dovetail joint on one module 1 engages with the tail end 8 of another module 1 resulting in an end to end arrangement of modules to form the apparatus of the spiral garden 10.

Figure 4:
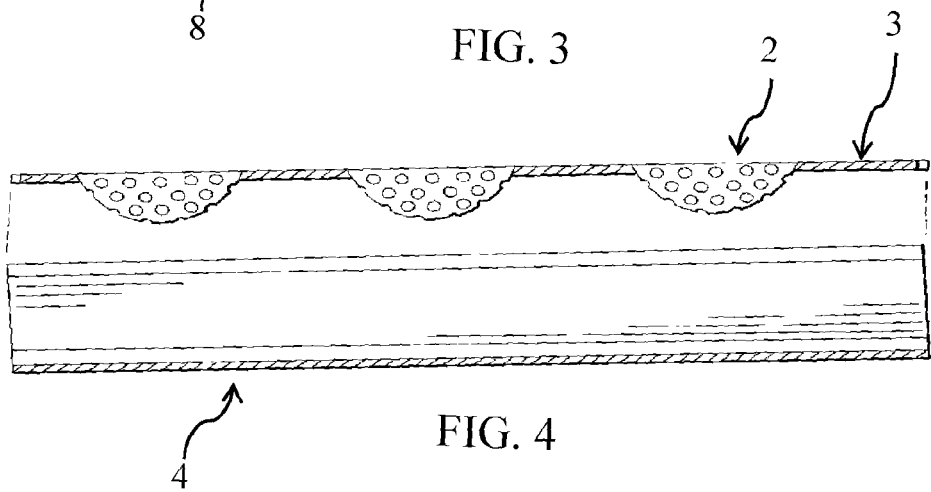
FIG. 4 is a side sectional view of a module of the spiral garden.

FIG. 4 is a side sectional view of a module in the spiral garden 10 apparatus illustrating the side view of the perforated divots 2, the top section 3 and the bottom section 4. The top section 3 of the module 1 with the perforated divots 2 can be separated and lifted up from the bottom section 4 of the module 1. In this embodiment, the bottom sections of the module 1 connected end to end through the dovetail joints can be filled with potting or garden soil to grow plants in the traditional way.

Figure 5:
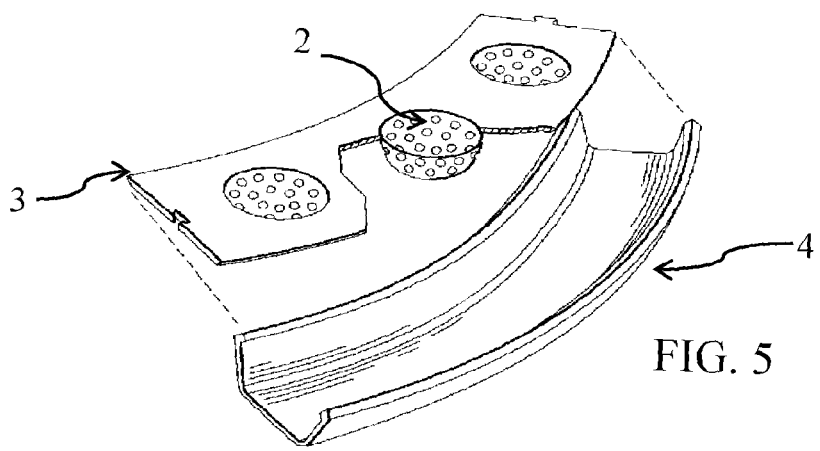
FIG. 5 is an exploded view of the top and bottom sections of a module with a perforated divot in relief.

FIG. 5 is an exploded view of the top 3 and bottom 4 sections of a module with a perforated divot 2 shown in relief. The figure also demonstrates the manner in which the top section 3 can be separated and lifted up from the bottom section 4 of the module.

Figure 6:
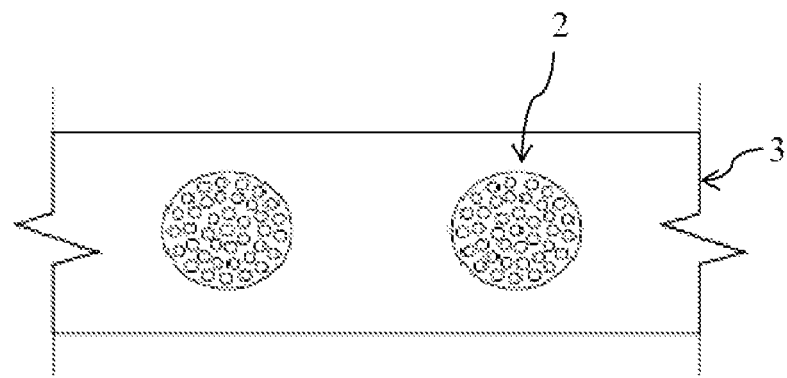
FIG. 6 is a top plan view of the upper section of a module with the perforated divots.
Figure 7:
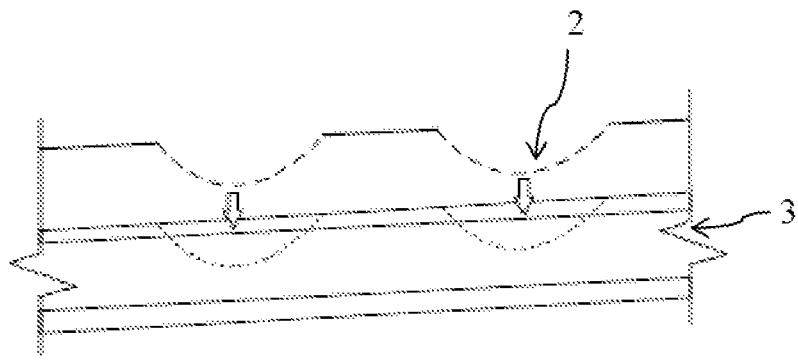
FIG. 7 is a side sectional view of a module showing the perforated divots in relief.

FIG. 6 is a top plan view of the upper section 3 of a module with the perforated divots 2 and FIG. 7 is a side sectional view of a module showing the configuration of the perforated divots 2 fitting on the top module section 3.

Figure 8:
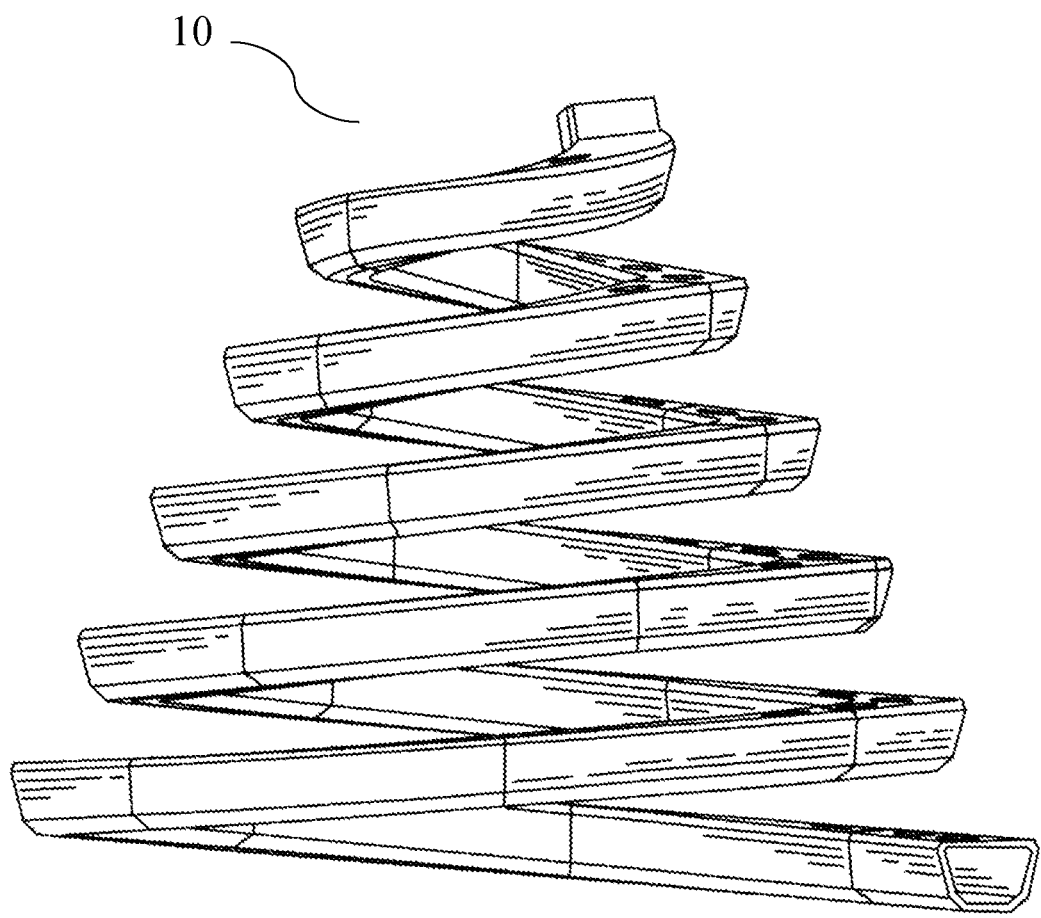
FIG. 8 is a perspective side elevation view of the spiral garden apparatus.

FIG. 8 is a side elevation view of the spiral garden 10 apparatus providing a perspective of the spiral pyramid shape of the garden.

The foregoing description of the present invention of the spiral garden through its figures and preferred embodiments should not be construed to limit the scope of the invention. It should be understood and obvious to one skilled in the art that alternatives, modifications, and variations of the embodiments as described may be construed as being within the spirit and scope of the invention.

What is claimed is:

1. A modular apparatus for the hydroponic cultivation of plants, said apparatus comprising:

a plurality of pre-fabricated conical-shaped module structure members;

said plurality of pre-fabricated conical-shaped module structure members having a top section and a bottom section;

said top sections of the pre-fabricated conical-shaped module structure members connected end to end through dovetail joint structure members;

said bottom sections of the pre-fabricated conical-shaped module structure members connected end to end through dovetail joint structure members;

said pre-fabricated conical-shaped module structure members connected end to end through dovetail joint structure members forming a pyramid-shaped spiral garden apparatus;

said pre-fabricated conical-shaped module structure members forming a hollow tube-like interior to act as a conduit for the flow of water or nutrient solutions from the top of the spiral pyramid-shaped spiral garden apparatus to the bottom of the said apparatus;

said top sections of the pre-fabricated conical-shaped module structure members configured with contoured and perforated cup-shaped divot members;

said contoured and perforated cup-shaped divot members capable of holding the root balls of plants with or without an inert medium matrix;

said pyramid-shaped spiral garden apparatus configured with an intake spout structure member; and said pyramid-shaped spiral garden apparatus configured with an outtake spout structure member.

2. The modular apparatus as in claim 1 wherein there are three or more contoured and perforated cup-shaped divot members evenly spaced on the top sections of the pre-fabricated conical-shaped module structure members.

3. The modular apparatus as in claim 1 wherein a nutrient-rich solution is introduced through the intake spout structure member and released through the outtake spout structure member.

4. The modular apparatus according to claim 1 wherein the pyramid-shaped spiral garden apparatus is configured to have a downward slope that allows for nutrient-rich solutions or water to bathe and saturate the root balls of the plants held in the perforated cup-shaped divot members and prevent ponding and water logging within the apparatus.

5. The modular apparatus as in claim 1 wherein the dovetail joint structure members connecting the pre-fabricated conical-shaped module structure members end to end, form a tight seal, to exclude light from the inside of the hollow tube-like interior and prevent the growth of algae.

6. The modular apparatus as in claim 1 wherein the outtake spout structure member can be capped to prevent the flowing out of the nutrient-rich solution.

7. The modular apparatus as in claim 1 wherein the outtake spout structure member can be uncapped to release the nutrient rich solution to replace the apparatus with fresh nutrient-rich solution.

8. The modular apparatus as in claim 1 wherein the pre-fabricated conical-shaped module structure members are made of heavy plastic or similar material to withstand the weight of water, nutrient, solutions, inert medium, or soil.

9. The modular apparatus as in claim 1 wherein the apparatus can be used for aeroponic cultivation of plants.

10. The modular apparatus as in claim 1 wherein the top sections of all the pre-fabricated conical-shaped module structure members connected end to end through dovetail joint structure members can be removed and the bottom sections connected end to end through dovetail joint structure members and filled with potting or garden soil for the non-hydroponic cultivation of plants.

11. The modular apparatus as in claim 1 wherein the apparatus is portable and can be easily assembled by connecting the pre-fabricated module structure members through the dovetail joint structure members and taken apart for re-assembly in a different location or for storage.

* * * * *